United States Patent [19]

Collins

[11] 4,113,901
[45] Sep. 12, 1978

[54] METHOD OF APPLYING A LAYER OF POLYURETHANE FOAM ONTO A CUT OR GROUND SURFACE OF POLYURETHANE FOAM

[75] Inventor: Michael H. Collins, Huxley, Nr. Chester, England

[73] Assignee: Shell Internationale Research Maatschappij, B.V., The Hague, Netherlands

[21] Appl. No.: 693,273

[22] Filed: Jun. 4, 1976

[30] Foreign Application Priority Data

Sep. 22, 1975 [GB] United Kingdom ............... 38779/75

[51] Int. Cl.² ......................... B05D 7/22; B32B 35/00
[52] U.S. Cl. .................................. 427/236; 427/140; 427/239; 427/289; 427/290; 427/421; 428/35; 220/430; 220/444; 220/901
[58] Field of Search ............... 427/140, 181, 203, 204, 427/206, 230, 236, 239, 289, 290, 292, 421; 428/315.35, 425; 114/74 A; 220/9 F, 9 LG, 18; 264/31, 34, 36

[56] References Cited

U.S. PATENT DOCUMENTS

| 2,320,425 | 6/1943 | Glaes et al. ................ 264/36 X |
| 2,955,952 | 10/1960 | Herbst .......................... 427/140 |
| 3,380,213 | 4/1968 | Hartman et al. ............. 264/36 X |
| 3,687,087 | 8/1972 | Yurkoski et al. ............ 220/9 F X |
| 3,772,113 | 11/1973 | Patrick ...................... 427/140 X |
| 3,844,863 | 10/1974 | Forsythe et al. .......... 264/36 X |
| 3,902,940 | 9/1975 | Heller et al. .............. 264/36 X |
| 3,931,908 | 1/1976 | Cheyney .................... 220/9 F |

FOREIGN PATENT DOCUMENTS

1,173,424 12/1969 United Kingdom.
1,300,352 12/1972 United Kingdom.

Primary Examiner—Shrive P. Beck
Attorney, Agent, or Firm—Pravel, Wilson & Gambrell

[57] ABSTRACT

A method of manufacturing a heat-insulating polyurethane foam lining of a container having a rigid outer shell with flat inner wall surfaces that intersect to form corners of the container for transport or storage of liquefied gases is disclosed. The flat inner surfaces of the rigid outer shell of the container located in both sides of a corner of the container are covered with polyurethane foam by spraying layers of polyurethane foam onto the surfaces and on top of each other. The end parts of the layers of polyurethane foam which are located adjacent to the corner at the intersection of two surfaces are cut or ground to form a gap defined by substantially flat planes adjacent to the corner. A thin layer of a sealing material is then applied onto the flat planes of the gap and allowed to set. The sealing material may be either an epoxy resin formulation or a polyurethane resin formulation. Layers of polyurethane foam are then sprayed onto the layer of sealing material and into the gap between said flat planes and the corner part of the rigid outer shell in order to fill up the gap and to provide a strong bond between foam filling the gap and the layers on the flat surfaces. The process provides significantly improved bonding strength between the respective polyurethane foam layers.

1 Claim, 4 Drawing Figures

METHOD OF APPLYING A LAYER OF POLYURETHANE FOAM ONTO A CUT OR GROUND SURFACE OF POLYURETHANE FOAM

BACKGROUND OF THE INVENTION

The invention relates to the manufacture of a thermally insulated container for the storage or transport of liquefied gases, for example propane, methane or natural gas, comprising a lining of polyurethane foam arranged on the inner surface of a rigid outer shell. Containers of this kinds are described, for example, in applicant's British Pat. No. 1,173,424.

In the manufacture of such thermally insulated containers, the lining of polyurethane foam is applied to the rigid outer shell by spraying a number of layers of polyurethane foam on top of each other until the lining has reached the desired thickness. The polyurethane foam is preferably applied mechanically by means of specifically designed spraying apparatus, such as described, for example, in applicant's British Pat. No. 1,300,352.

Sometimes it is necessary to carry out the spraying of polyurethane foam by a spraying apparatus which is operated manually, for example, at the corners of a prismatic tank, or for carrying out repairs to the polyurethane foam lining of an existing container. In such cases, some of the foam already applied has to be removed by cutting or grinding beforehand. However, after having cut or ground the polyurethane foam lining, it is not possible to obtain a good bond to a further layer of polyurethane foam (i.e., the bond strength is less than the cohesive strength of the foam).

SUMMARY OF THE INVENTION

It is an object of the invention to provide a method for obtaining a good bond between cut or ground polyurethane foam and a further layer of polyurethane foam.

For this purpose, the method of the invention comprises the steps of:

applying a thin layer of sealing material onto the cut or ground surface of polyurethane foam;

allowing the sealing material to set;

applying a layer of polyurethane foam by a spraying operation onto the layer of sealing material after it has set.

BRIEF DESCRIPTION OF THE DRAWINGS

The invention will be further explained with reference to the drawings, wherein.

DESCRIPTION OF THE PREFERRED EMBODIMENT

Very good results are obtained if the sealing material used is an epoxy resin formulation which comprises an epoxy resin and a curing agent or if the sealing material used is a polyurethane resin formulation which comprises a polyurethane resin and a curing agent.

Instead it is possible to use a suitable paint as a sealing material for the above purpose.

Figure 1:
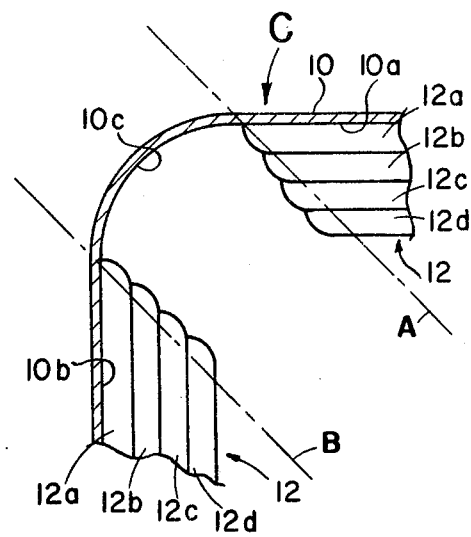
FIG. 1 shows schematically a plan view, partially cut away, of a horizontal cross-section of a corner part of a prismatic thermally insulated container during its manufacture.
Figure 2:
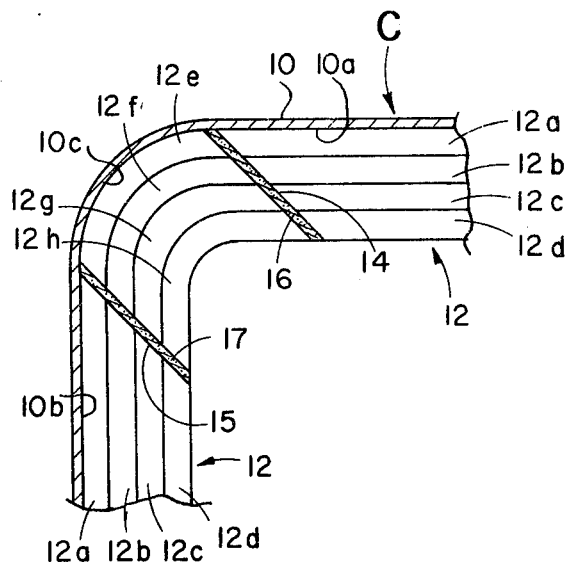
FIG. 2 shows schematically a plan view, partially cut away, of a horizontal cross-section of the same corner part of a thermally insulated prismatic container of FIG. 1 after completion in accordance with the process of the invention.

Referring to the drawings, in FIGS. 1 and 2, the reference numeral 10 indicates the rigid outer shell of a prismatic container C for storing or transporting liquefied gas. After the layers of polyurethane foam 12a, 12b, 12c and 12d have been applied mechanically by a suitable spraying machine onto the flat surfaces 10a, 10b of the rigid outer shell 10, it is necessary to line the corner 10c of the rigid outer shell 10 with polyurethane foam 12. Beforehand, the polyurethane foam 12 is cut or ground along the planes indicated respectively by the chain-dotted lines A and B, so that substantially flat planes 14, respectively 15, are formed. However, spraying of polyurethane foam directly onto the said cut or ground surfaces 14, respectively 15, has the disadvantage that is impossible to get a bond of good quality between the further layers of foam and the cut or ground surfaces 14, respectively 15.

Applicant has found, however, that a bond of good quality can be obtained by applying a layer of sealing material 16, respectively 17, onto the surfaces 14, respectively 15, before applying further layers of polyurethane foam. A suitable sealing material for this purpose is an epoxy resin formulation which comprises an epoxy resin and a curing agent or a polyurethane resin formulation comprising a polyurethane resin and a curing agent. Instead, it is possible to use a suitable conventional paint for this purpose. Such compositions and methods of mixing same, where required, are well-known in the art and readily available commercially from a number of manufacturers. Accordingly, a more detailed description of such compounds will not be set forth herein.

After the application of the layers of sealing material 16 or 17, the sealing material is allowed to set. When the sealing material has set, the gap between the layers 16 and 17 is filled up by applying layers of polyurethane foam 12e, 12f, 12g and 12h by a spraying operation which is carried out manually.

If the lining of polyurethane foam of a container for storage or transport of liquefied gases has to be repaired, for example, because a crack has developed in the lining, the method according to the invention is applied in the following manner.

Figure 3:
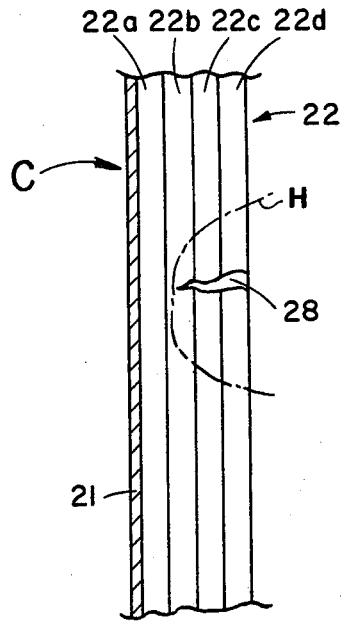
FIG. 3 shows schematically a partially cut away plan view of a horizontal cross-section of part of a wall of a thermally insulated container having a damaged polyurethane foam lining.
Figure 4:
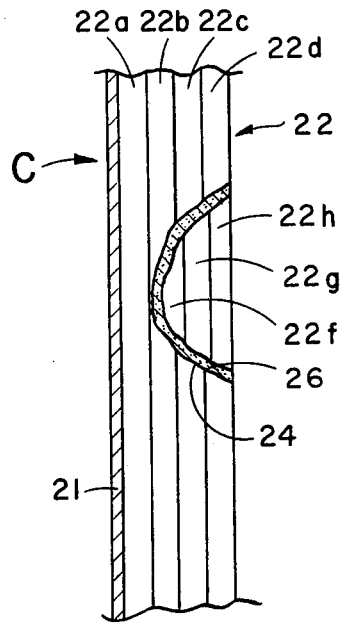
FIG. 4 shows schematically a partially cut away plan view of a horizontal cross-section of the same part of the wall of the thermally insulated container of FIG. 3 after the polyurethane foam lining has been repaired.

In the container C as shown in FIGS. 3 and 4, the rigid outer shell is indicated by the reference numeral 21 and layers of polyurethane foam 22 which form the heat-insulating lining are indicated by the reference numerals 22b, 22c and 22d. If a crack 28 has developed in the lining of polyurethane foam and it is desired to repair the lining, polyurethane foam is removed by cutting and grinding so that a hole is formed which is bordered by the plane which is indicated by the chain-dotted line H. The cut or ground surface 24 of the hole in the polyurethane foam is then covered with a layer 26 of the above-mentioned sealing material, whereafter said sealing material is allowed to set.

When the sealing material of the layer 26 has set, the remaining gap is filled up by applying layers of polyurethane foam 22f, 22g and 22h by a spraying operation which is carried out manually.

The thickness of the layers of sealing material 16, respectively 17, respectively 26, is preferably of the order of magnitude of about 0.2 to 0.4 mm. The thickness is controlled to ensure that no stress concentrations are introduced.

I claim:

1. A method of manufacturing a heat-insulating polyurethane foam lining of a container having a rigid outer shell with flat inner wall surfaces that intersect to form corners of the container for transport or storage of liquified gases comprising the steps of:

covering the flat inner surfaces of the rigid outer shell of the container located at both sides of a corner of the container with polyurethane foam by spraying layers of polyurethane foam onto said flat inner surfaces and on top of each other;

cutting or grinding the end parts of the layers of polyurethane foam which are located adjacent to the corner of the intersection of two surfaces to form a gap defined by substantially flat planes adjacent to the corner;

applying a thin layer of a sealing material selected from the group consisting of (1) an epoxy resin formulation and (2) a polyurethane resin formulation, onto the flat planes of the gap and allowing the sealing material to set; and spraying layers of polyurethane foam onto the layer of sealing material and into the gap between said flat planes and the corner part of the rigid outer shell in order to fill up the gap and to provide a strong bond between foam filling the gap and the layers n the flat surfaces.

* * * * *